United States Patent
Staples

(10) Patent No.: US 7,450,017 B2
(45) Date of Patent: Nov. 11, 2008

(54) SYSTEM TO DETECT AND MONITOR TEMPERATURE

(75) Inventor: Peter Ethan Staples, Los Angeles, CA (US)

(73) Assignee: Blue Clover Design, LLC, Los Angeles, CA (US)

( * ) Notice: Subject to any disclaimer, the term of this patent is extended or adjusted under 35 U.S.C. 154(b) by 311 days.

(21) Appl. No.: 11/353,363

(22) Filed: Feb. 14, 2006

(65) Prior Publication Data

US 2006/0181410 A1    Aug. 17, 2006

Related U.S. Application Data

(60) Provisional application No. 60/653,061, filed on Feb. 14, 2005.

(51) Int. Cl.
*G08B 17/00* (2006.01)

(52) U.S. Cl. .................. 340/584; 340/585; 340/586; 62/125; 220/592.16; 220/592.17; 222/146.6; 222/179.5

(58) Field of Classification Search ......... 340/584–586; 62/125; 220/592.16–592.17; 222/146.6, 222/179.5
See application file for complete search history.

(56) References Cited

U.S. PATENT DOCUMENTS

| | | | |
|---|---|---|---|
| 3,983,753 A | 10/1976 | Greenleaf | |
| 4,305,289 A | 12/1981 | Cornelison | |
| 4,738,858 A | 4/1988 | Mukouyama | |
| 5,262,758 A | 11/1993 | Nam | |
| 5,482,373 A | 1/1996 | Hutchinson | |
| 5,746,114 A | 5/1998 | Harris | |
| 5,802,863 A | 9/1998 | Cowans | |
| 5,914,255 A | 6/1999 | Grae | |
| 6,065,391 A | 5/2000 | Archard et al. | |
| 6,158,227 A | 12/2000 | Seeley | |
| 6,182,454 B1 | 2/2001 | McNeilan | |
| 6,450,008 B1 | 9/2002 | Sunshine | |
| 6,471,398 B2 | 10/2002 | Ukai | |
| 6,536,306 B1 | 3/2003 | Harris | |
| 6,539,842 B1 | 4/2003 | Chapman et al. | |
| 6,568,848 B1 | 5/2003 | Chapman et al. | |

(Continued)

FOREIGN PATENT DOCUMENTS

DE    102 56 113 B3 *   3/2004

OTHER PUBLICATIONS http://www.extech.com/instrument/products/alpha/IR201.html—Extech Instruments Pocket IR Thermometer, earliest date of Aug. 28, 2007.

*Primary Examiner*—George A Bugg
*Assistant Examiner*—Samuel J Walk
(74) *Attorney, Agent, or Firm*—Jeffrey Schox

(57) ABSTRACT

The system 10 of the preferred embodiment includes a sensor 12 to detect temperature; a user interface 14 that includes a display 16 to output the detected temperature, controls 18 to receive a target temperature, and an alert 20 to signal the user when an event occurs; and a base 22. The system 10 of the preferred embodiment has been specifically designed to grasp the neck of a wine bottle of any various size, detect the temperature of the wine, compare the detected temperature to the target temperature, and signal the user when the detected temperature is equivalent to the target temperature.

24 Claims, 3 Drawing Sheets

U.S. PATENT DOCUMENTS 6,578,469 B2 6/2003 Sharpe
6,839,636 B1 1/2005 Sunshine
2006/0026971 A1* 2/2006 Sharpe ........................ 62/126
2007/0147469 A1* 6/2007 Harris ........................ 374/121

* cited by examiner

SYSTEM TO DETECT AND MONITOR TEMPERATURE

CROSS-REFERENCE TO RELATED APPLICATIONS

This application claims the benefit of U.S. Provisional Application No. 60/653,061, filed 14 Feb. 2005, which is incorporated in its entirety by this reference.

DESCRIPTION OF THE PREFERRED EMBODIMENT

The following description of the preferred embodiment of the invention is not intended to limit the invention to this preferred embodiment, but rather to enable any person skilled in the art to make and use this invention.

Figure 1:
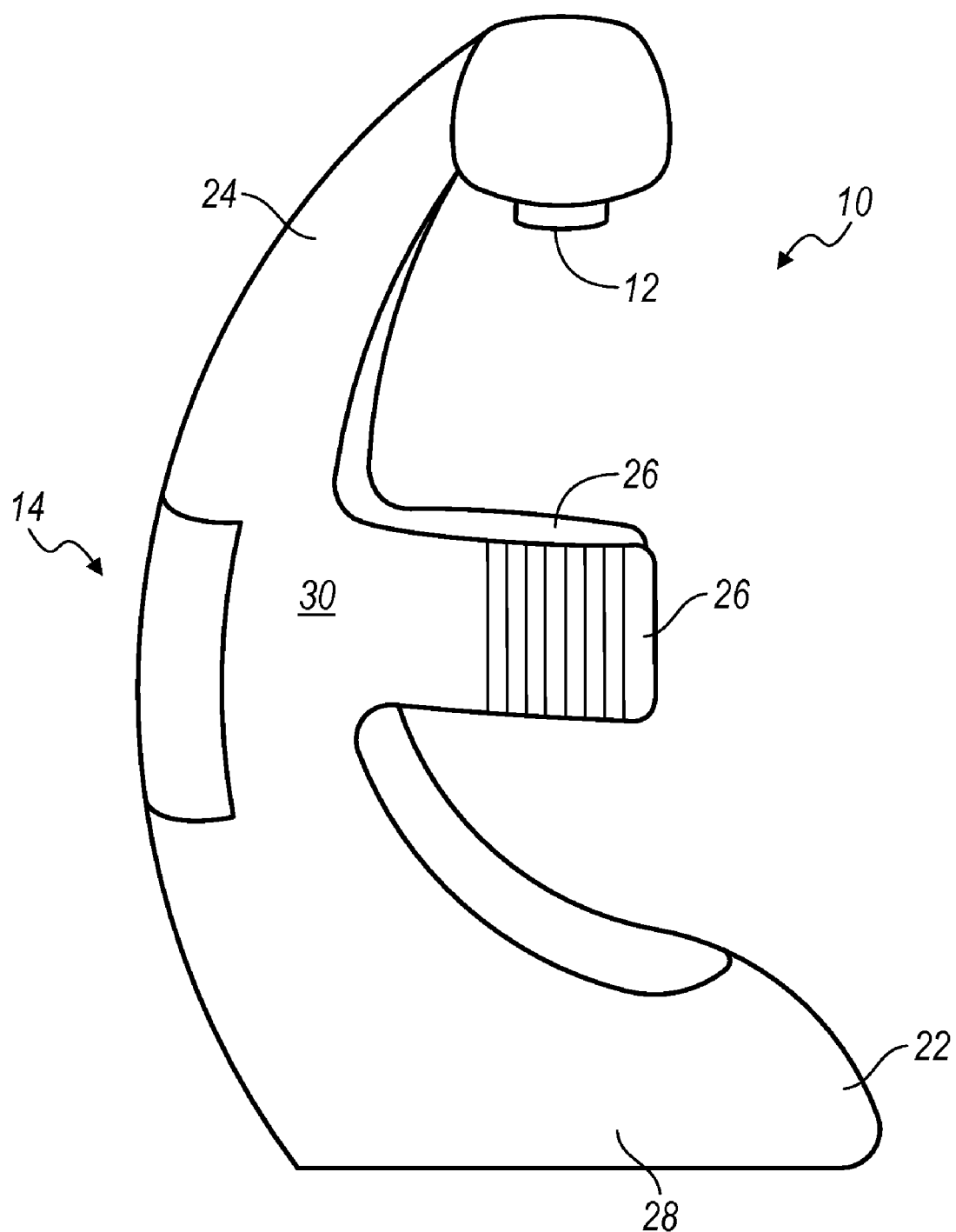
FIG. 1 is a side view of the preferred embodiment of the invention.
Figure 2:
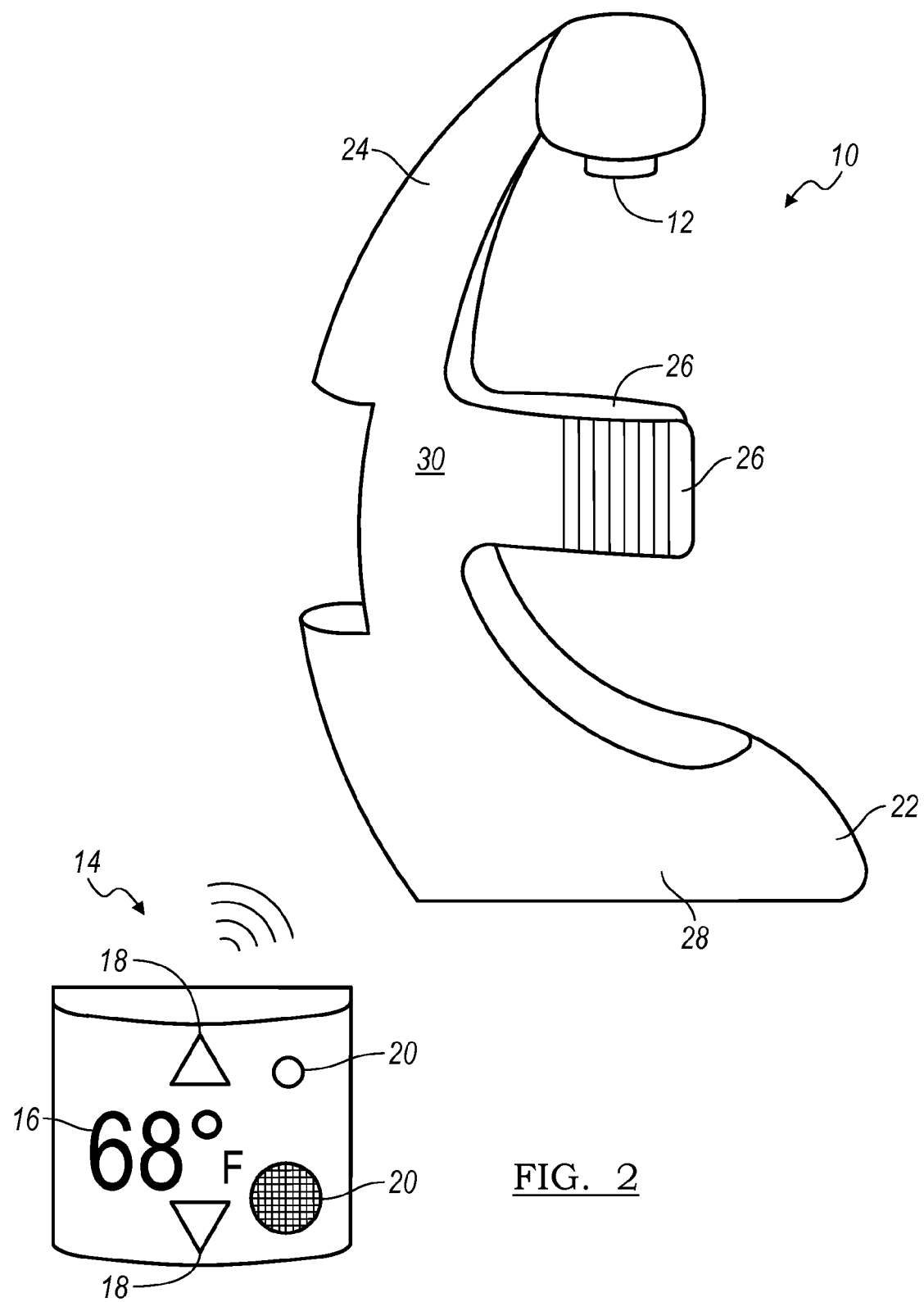
FIG. 2 is also a side view of the preferred embodiment of the invention, but with the user interface in a removed state.
Figure 3:
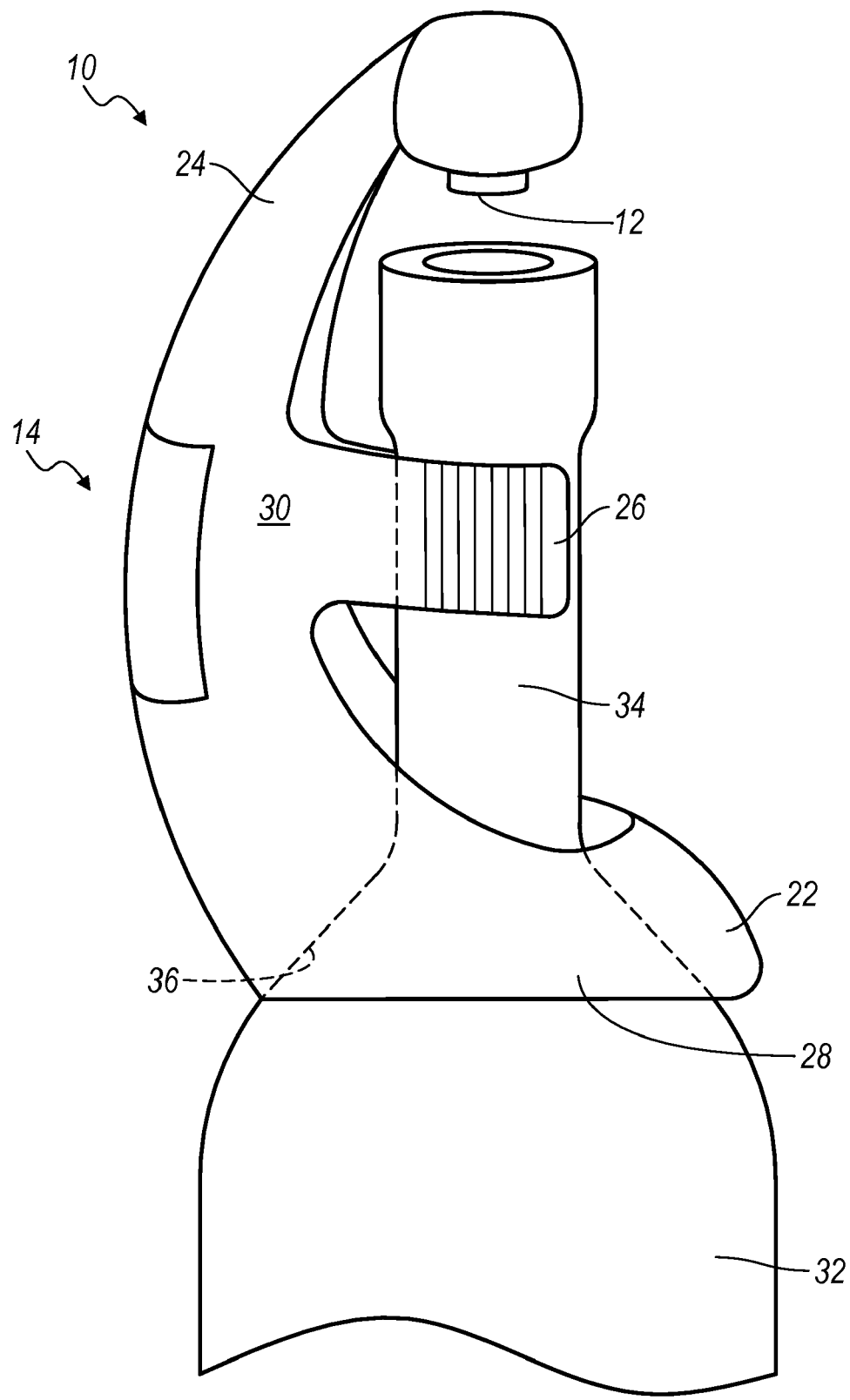
FIG. 3 is also a side view of the preferred embodiment of the invention, but with the system inserted over the neck of a wine bottle.

As shown in FIGS. 1 and 2, the system 10 of the preferred embodiment includes a sensor 12 to detect temperature; a user interface 14 that includes a display 16 to output the detected temperature, controls 18 to receive a target temperature, and an alert 20 to signal the user when an event occurs; and a base 22. As shown in FIG. 3, the system 10 of the preferred embodiment has been specifically designed to grasp, or mount on, the neck of a wine bottle 32 of any various size, detect the temperature of the wine, compare the detected temperature to the target temperature, and signal the user when the detected temperature is equivalent to the target temperature. The system 10, however, may be used to detect and monitor temperature of any suitable substance in any suitable container.

As shown in the FIGURES, the sensor 12 of the preferred embodiment functions to detect the temperature of a substance held by or located near the system 10. The sensor 12 may alternatively detect any suitable, additional information such as humidity or pressure. The sensor 12 is preferably a non-contact sensor, which is not required to come in contact with the item in order to detect the temperature of the item. The lack of contact between the sensor and the substance, especially if the substance is an expensive wine, is important so as to not taint or alter the substance. The non-contact sensor is preferably an Infrared (IR) sensor with a built-in laser pointer to identify the area of the substance where the temperature is being detected. Alternatively, the non-contact sensor may be a simple IR sensor, an optical pyrometer, a fiber optic thermometer, an acoustic meter, an ultrasonic meter, or any suitable, non-contact means of detecting temperature. The non-contact sensor is preferably located either in the neck 24 of the system 10, but may alternatively be located in any suitable location.

As shown in FIG. 2, the user interface 14 of the preferred embodiment includes a display 16, controls 18, and an alert 20. The display 16 functions to output the detected temperature and any other suitable information from the sensor 12 to the user. The controls 18 function to receive a target temperature and any other suitable information from the user. The alert 20 functions to signal the user when an event occurs. The user interface 14 may alternatively be any suitable combination of these elements or may include any other suitable elements to perform these functions. Preferably, the user interface 14 is removable from, and re-attachable to, the base 22. The user interface 14 preferably snaps into the base 22 while it is not in use, but may alternatively be stored in any suitable location. This feature allows the user to control and monitor the temperature at a distance from the system 10 and allows the user to coordinate the temperatures of various items with a single user interface 14. The user interface 14 preferably connects to the sensor 12 with a wireless transceiver. The wireless transceiver may also connect the user interface 14 to an adjacent system 10, or may function to connect the system 10 to a larger network, such as a ZigBee network, a Bluetooth network, or an Internet-protocol based network. The sensor 12 preferably transmits a radio frequency (RF) signal and a receiver receives the RF signal, but may alternatively transmit a signal over a network (such as a wireless local access network, or the Internet using an internet protocol address) and a receiver receives the signal. The removing and/or re-attaching of the user interface 14 may trigger other features. As an example, the removal of the user interface 14 may turn on the wireless transceiver and/or may adjust the alert (by changing the alert from an audible signal to a tactile signal, by enabling an alert on the user interface, or by adjusting the volume of the alert).

The display 16 of the preferred embodiment functions to output the detected temperature and any other suitable information from the sensor 12 to the user. In a first variation, the display 16 is a digital meter that may be adapted to display information in any appropriate scale as desired by the user. The display 16 is preferably a liquid crystal display (LCD) display with a backlight feature to enable use in a dark location, but may alternatively be any suitable digital meter. In a second variation, the display 16 is an analog meter. The analog meter is preferably a needle on a calibrated scale, but may alternatively be any suitable analog meter.

The controls 18 of the preferred embodiment function to receive a target temperature and any other suitable information as inputted by the user including, but not limited to, the scale of the display, a target temperature, or a desired alert 20. In a first variation, the controls 18 are mechanical controls and are preferably buttons, dials, keypads, or any other suitable mechanical controls. In a second variation, the controls 18 are integrated into a touch screen system. The touch screen system is preferably a resistive system that responds to multiple stimuli, meaning that the user is not required to use a special instrument to operate the touch screen. The touch screen system may alternatively be any other suitable touch screen system such as a capacitive system or surface acoustic wave system. In a third variation, the controls 18 are integrated into a voice-activated system. This variation allows the user to operate the system 10 from a distance or while his or her hands are occupied. The voice-activated system is preferably a programmable, speaker independent (can recognize any user) system, but may alternatively be a voice-activated system with any suitable configuration. In a fourth variation, the display may include any suitable device to receive a target temperature and any other suitable information as inputted by the user.

The alert 20 of the preferred embodiment functions to signal the user when an event occurs. The event preferably occurs when the detected temperature is equivalent to the target temperature, but may alternatively be any other suitable event. In a first variation, the alert 20 is an audible signal that alerts the user of the occurrence of the event. The audible signal is preferably a tone such as a chime, but may alternatively be a recorded voice or a buzzer or any suitable audible signal. In a second variation, the alert 20 is an illuminating signal that alerts the user of the occurrence of the event. The illuminating signal is preferably a light that turns on, turns off, or begins to flash and signal the occurrence of the event. The light is preferably a light emitting diode (LED), but may alternatively be any suitable light to provide an illuminating signal to the user. In a third variation, the alert 20 is a visual signal that alerts the user to the occurrence of the event. The visible signal is preferably a message on a screen, but may alternatively be any suitable visible signal. In this variation, the screen is preferably an LCD screen but may be alternatively any suitable screen to provide a visual signal to the user. In a fourth variation, the alert 20 is a tactile signal that alerts the user that the event has occurred. This variation allows the user to be silently notified of the event. The tactile signal is preferably a vibration but may be any suitable means of providing a tactile signal to the user. In alternative variations, the alert 20 may be any suitable combination of signals to alert the user that the event has occurred.

As shown in the FIGURES, the base 22 of the preferred embodiment functions to connect the elements of the system 10. The base 22 preferably includes a neck 24, arms 26, legs 28, and a body 30. The base 22 may alternatively include any combination of these elements or any suitable, additional elements to connect the elements of the system 10. The base 22, neck 24, arms 26, legs 28, and body 30 are preferably a durable plastic material but may alternatively be any suitable material.

The neck 24 of the preferred embodiment provides a possible location for the sensor 12 and functions to hold the sensor 12 in an appropriate orientation with respect to the container grasped by the system 10. The neck 24 is preferably shaped such that it extends over the substance and fits a variety of items of different shapes and sizes, but alternatively the neck 24 may be of any suitable shape and size. The arched design of the neck 24 in the preferred embodiment not only prevents the device from contacting the substance but also prevents the device from touching the opening of the container. In the example of an expensive wine, a connoisseur would strongly prefer that nothing touch the opening of the wine bottle 32 other than wine. Thus, the system 10 allows the temperature of the wine to be detected and monitored without touching the wine or even the opening of the wine bottle 32. In a first variation, the neck 24 has a swivel feature, which enables the neck 24 to swivel to different orientations.

The arms 26 of the preferred embodiment function to stabilize the system 10 against a portion of the container (such as the neck 34 of the wine bottle 32). In a first variation, the arms 26 are flexible grippers. The arms 26 are preferably a compliant material that provides a frictional engagement with the container. The compliant material of the arms 26 is preferably made of rubber, but may alternatively be made of any suitable compliant material, such as plastic or wood. In a second variation, the arms 26 have a mechanical element that adjusts the span of the arms 26 to fit the size of the container. The mechanical element is preferably a hinge and spring mechanism, but may alternatively utilize gears, sliders or any suitable means of adjusting the span of the arms 26 to fit the size of the container.

The legs 28 of the preferred embodiment function to grasp the container in the correct orientation with respect to the system 10. Preferably, the legs 28 define an opening that is properly sized to easily fit over the neck 34 of the wine bottle 32, yet rest on the shoulder 36 of the wine bottle 32. In a first variation, as shown in the FIGURES, the legs 28 extend toward and merge into each other to define a substantially circular shape. In a second variation, the legs 28 could extend toward each other, but not actually touch each other, to define a substantially C-shape.

The body 30 of the preferred embodiment functions to hold the container in the correct orientation with respect to the system 10. The body 30 is shaped to provide an aesthetically pleasing or themed aspect to the system 10 while providing a functional base for the system 10. For example, the body 30 may resemble a wine bottle, but may alternatively be of any suitable size, shape, or theme.

The system 10 of the preferred embodiment may also include a circuit. The circuit functions to connect the sensor 12 to the display 16, compare the output from the sensor 12 to the target temperature set by the controls 18 of the user interface 14, and connect to the alert 20 of the user interface 14. The circuit may utilize a control loop or any suitable means to connect the sensor 12 to the user interface 14 and perform the necessary functions. Additionally, the circuit may connect the system 10 to a data acquisition system, computer controllers, a wireless or Internet system, or any other suitable system.

The system 10 of the preferred embodiment may also include a power source. The power source functions to power each element requiring power within the system 10. In a first variation, the power source is a battery. With this variation, the system 10 may also include a "power save" mode. In the "power save" mode, the system 10 reduces the frequency of sensor inputs and/or RF transmission to conserve battery power. The battery may be any suitable battery to provide sufficient power to the system 10. In a second variation, the power source is preferably a power cord that attaches to the power grid of the building in which the system 10 is located.

The system 10 of the preferred embodiment may also include a timing mechanism. The timing mechanism functions to shut the system 10 off after a predetermined length of time, as set by the user, so that the system 10 is not be inadvertently left on and the power source 16 is not be unnecessarily drained.

As a person skilled in the art will recognize from the previous detailed description and from the figures and claims, modifications and changes can be made to the preferred embodiment of the invention without departing from the scope of this invention defined in the following claims.

I claim:

1. A system to detect and monitor temperature of a substance through an opening of a container, comprising:
   a sensor to detect temperature of the substance;
   a user interface coupled to the sensor and adapted to output information related to the detected temperature, to receive information related to a target temperature, and to signal an event; and
   a base adapted to grasp the container and position the sensor;
   wherein the user interface is removable from, and re-attachable to, the base thereby allowing the user to monitor the temperature of the substance at a distance from the system.

2. The system of claim 1, wherein the sensor is a non-contact sensor.

3. The system of claim 2, wherein the non-contact sensor is an Infrared (IR) sensor with a laser pointer adapted to visually identify the area of the substance where the sensor is detecting temperature.

4. The system of claim 1, wherein the interface and the sensor communicate over a wireless connection.

5. The system of claim 4, wherein the wireless connection is automatically established upon the removal of the interface from the base.

6. The system of claim 1, wherein the user interface includes an alert adapted to signal an event, and wherein the alert is automatically modified upon the removal of the interface from the base.

7. The system of claim 6, wherein the alert is automatically switched from an illuminating signal to an audible signal upon the removal of the interface from the base.

8. The system of claim 6, wherein the alert is automatically switched from an illuminating signal to a tactile signal upon the removal of the interface from the base.

9. The system of claim 1, wherein the user interface includes a display adapted to output the detected temperature of the substance.

10. The system of claim 1, wherein the user interface includes controls adapted to receive a target temperature from a user.

11. The system of claim 10, wherein the user interface includes an alert adapted to signal an event when the detected temperature is equivalent to the target temperature.

12. A system to detect and monitor temperature of a substance through an opening of a container, comprising:
   a sensor to detect temperature of the substance;
   a user interface coupled to the sensor and adapted to output information related to the detected temperature, to receive information related to a target temperature, and to signal an event; and
   a base adapted to grasp the container and position the sensor;
   wherein the base includes a neck adapted to position the sensor and arms adapted to grasp the container.

13. The system of claim 12, wherein the neck is shaped such that it extends over the container and allows detection of the temperature of the substance without any contact against the opening of the container.

14. The system of claim 12, wherein the neck includes a swivel mechanism to allow manipulation of the orientation of the sensor relative to the base.

15. The system of claim 12, wherein the arms are adapted to hold the neck of a wine bottle.

16. The system of claim 15, wherein the arms include a compliant material adapted to provide frictional engagement against the wine bottle.

17. The system of claim 15, wherein the arms include a mechanical element to allow adjustment of the span of the arms.

18. The system of claim 15, wherein the base further includes legs to hold the system in an upright orientation.

19. The system of claim 18, wherein the legs are adapted to fit over the neck of the wine bottle and rest on a shoulder of the wine bottle.

20. The system of claim 12, wherein the sensor is a non-contact sensor.

21. The system of claim 20, wherein the non-contact sensor is an Infrared (IR) sensor with a laser pointer adapted to visually identify the area of the substance where the sensor is detecting temperature.

22. The system of claim 12, wherein the user interface includes a display adapted to output the detected temperature of the substance.

23. The system of claim 12, wherein the user interface includes controls adapted to receive a target temperature from a user.

24. The system of claim 23, wherein the user interface includes an alert adapted to signal an event when the detected temperature is equivalent to the target temperature.

* * * * *